Patented May 6, 1952

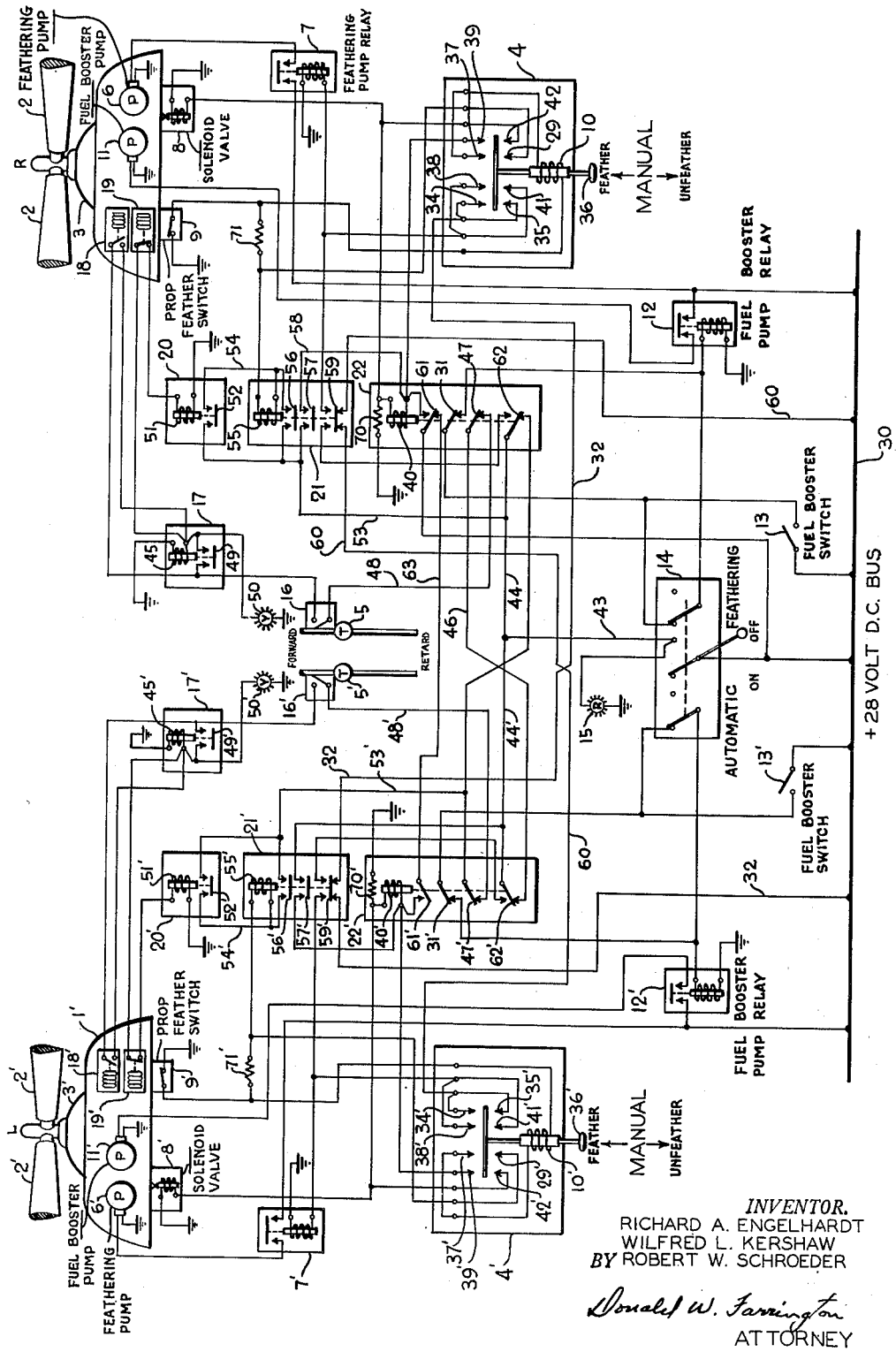

2,595,345

UNITED STATES PATENT OFFICE 2,595,345

PROPELLER FEATHERING CONTROL

Richard A. Engelhardt, Parkville, Wilfred L. Kershaw and Robert W. Schroeder, Middle River, Md., assignors to The Glenn L. Martin Company, Middle River, Md., a corporation of Maryland Application June 24, 1947, Serial No. 756,768

33 Claims. (Cl. 170—135.29)

This invention relates to an automatic feathering control for airplane engine propellers that acts in conjunction with the conventional manual feathering control for safety during take-off.

In the conventional two engine airplane, a pilot is fully occupied with manipulating several controls from the time he leaves the end of the runway, through the take-off period, until altitude is reached. If, during the critical period of take-off, one engine should fail, the pilot must cut that engine and feather the propellers to reduce drag, so that the airplane can continue take-off on one engine and reach altitude where the pilot will have time to investigate the cause of the engine failure and determine the proper action to be taken under the circumstances. The pilot must remember to feather the propeller of the engine that has failed, cut off the fuel booster pump, and cut off the engine to prevent restarting with a feathered propeller. Because of the several additional controls that must be operated upon the engine failure, in addition to the several controls that must be manipulated for normal take-off, it is obvious that even where an airplane is designed for single engine take-off, it may be very hazardous when one engine fails. There is the additional hazard resulting from a human element, in that the best of pilots might erroneously feather the propeller of the engine that is still delivering power. When he realizes that one engine has failed and that the proper procedure is to feather the propeller and cut off the engine, it is very easy to inadvertently feather the wrong propeller. The use of this invention will minimize the hazard during take-off, and relieve the pilot of much of the confusion resulting from an engine failure.

While the primary application of this invention is on a two engine airplane, it may be applied to a four engine airplane, although the hazard of single engine failure is not as great.

An object of this invention is the provision of an automatic control that is energized and can be operated only when the throttle is in the forward or take-off position. It is only during this period that automatic feathering of an engine is desirable. The automatic control is rendered inoperative by moving the throttle to any retarded position.

It is another object of this invention to provide a control circuit for the automatic feathering of the propeller that will operate only after high torque conditions of the engine have been reached, that is, after an engine has been brought up to speed and operated properly at high torque output. If, after this time the engine should fail, the propeller will be feathered automatically.

It is a further object of this invention to provide a control circuit in which, after take-off torque output has been reached and the throttle is in the take-off position, any subsequent low torque output of the engine, indicative of an engine failure, will result in the feathering of the propeller of that engine.

It is another object of this invention to include in the propeller feathering control circuit a time delay relay to discriminate between momentary fluctuation of the torque output of the engine, such as a sputter or cough, and a real engine failure.

It is a further object of this invention to include in the control circuit for the automatic feathering of one propeller, a relay that will interrupt the normal feathering control system of the other propeller, during the automatic feathering operation.

It is a furthher object of this invention to provide a relay in a feathering control circuit that holds in or locks in when one propeller is feathered manually or automatically, to preclude the second propeller from feathering automatically.

It is a further object of this invention to provide relays so interconnected in the propeller control circuits that in the event of two engine failure, only one engine propeller will be automatically feathered.

Further and other objects will become apparent from the description of the accompanying drawing which forms a part of this disclosure and in which like numerals refer to like parts.

The automatic control circuit of this invention is intended to supplement the conventional manual propeller feathering control. It is not intended to take full control of propeller feathering away from the pilot, but it supplements manual control in that if the pilot selects automatic feathering control he may still operate the manual control knobs for feathering and unfeathering, except in the case where the pilot is in error as to the proper corrective step to be taken upon an engine failure. That is, if the pilot should inadvertently attempt to feather the propeller delivering full horsepower on take-off when the other engine has failed, the automatic control circuit will prevent his manual effort from feathering the wrong propeller. Without such an automatic control, the pilot must start the plane down the runway, actuate his elevators, level off, gain speed, pull back on the control column for take-off, leave the runway, and start to climb. While holding back on the control column, he must raise his landing gear, actuate flaps, etc. and in the event of one engine failure at this time, he must actuate other controls to feather the propeller, cut out the auxiliary fuel booster pump, etc. so that the drag of the airplane will be decreased to a minimum and take-off can be continued until altitude has been reached, where the pilot can then determine the best course to take. If, however, the pilot, as he leaves the end of the runway, throws the selector switch to the automatic feathering control circuit, after the plane is in the air and an engine fails, he may go through the motions of the things he knows instinctively must be done, but should he fail to perform the proper functions or be tardy in his performing them, the automatic control will cut out the booster pump and feather the propellers to reduce drag, so that the satisfactory take-off may be accomplished.

The automatic control is governed by engine torque. The control circuit is armed or readied for operation by high torque or high horse power output of the engine, and the feathering control circuit is actuated by low torque indicating failure of the engine. Any condition, indicative of engine performance may be relied upon, but it has been found that using a signal from the torque meter that is conventional equipment on all commercially available airplanes is most satisfactory. It is a more reliable source of indication of engine performance than manifold pressure or engine speeds that might also be employed. The conventional form of torque meter employs hydraulic pressure that is balanced against torque in the reduction gearing of the ordinary aircraft engine. It is a simple matter through the use of pressure switches to employ the pressure in the torque meter system to operate switches. Any form of torque meter on the engine may be employed, such as those involving strain gages in engine mounts that will give an indication of torque output.

The preferred embodiment for carrying out the invention is illustrated in the drawing with reference to a two engine airplane. The drawing is a schematic arrangement of the essential parts and an electrical circuit diagram of the parts. The diagram is symmetrical except for the interconnection of the supervisory relays which will be later described.

With reference to the drawing, the engine generally indicated as 1 has propeller blades 2 mounted on propeller hub 3 which houses a propeller feathering mechanism. This mechanism may be entirely electrically controlled, mechanically operated, or it may be hydraulic fluid actuated with electrical controls; the latter is illustrated in the drawing. Any propeller feathering mechanism will have a manual control, such as knob 36, for feathering and unfeathering the propeller. Throttle 5 is a conventional throttle connected to control the engine. The forward or advanced positions of the throttle are the full powered positions for take-off with the retarded position being for idling. The equipment described above is conventional equipment found in any airplane engine installation. The throttle is used to regulate the power output of the engine, and manual control 36 is used to feather and unfeather the propeller at the will of the pilot. If the feathering is accomplished by hydraulic fluid actuated by electric control, feathering pump 6 will deliver a hydraulic fluid to the feathering mechanism. Feathering pump relay 7 will be controlled by control 4 to energize this pump. Solenoid valve 8 will control the direction of flow of fluid from the pump to the propeller feathering mechanism housed in hub 3 to cause the propeller blades to feather or unfeather. A propeller feathered switch 9 is provided that opens upon full feathering of the propeller to release hold-in coil 10 of the manual feathering switch 4 to deenergize the feathering pump control when the propellers have reached the fulled feathered position.

A fuel booster pump 11 is required to supplement the delivery of fuel to the engine by the engine-driven pumps. It is controlled by relay 12 actuated by fuel booster switch 13. In the event that the pilot operates control 4 to feather the propeller upon engine failure, he must also remember to cut off fuel booster switch 13, or pump 11 will continue to operate and cause gasoline to be discharged through the fuel nozzle into the engine cylinders. The above equipment will be found in any fluid actuated, electrically controlled engine propeller feathering system.

The propeller feathering control circuit of this invention has, in addition to the above mentioned equipment, a selector switch 14, which in the "off" position permits the operation of the conventional equipment in the usual manner, and in the "on" position also permits the operation of the conventional equipment in the usual manner, but if an engine failure should take place and the pilot is either too busy or tardy in taking the proper steps to cut the fuel booster pump and feather the propeller, the automatic control circuit will in response to a failing engine, perform the above operations required for the safety of the airplane. Signal light 15 indicates that the pilot has selected automatic control of the feathering. The control circuit switch 16 is associated with the throttle for the engine. The switch is so located that it will be closed when the throttle is in the forward positions suitable for take-off. After take-off, the throttle is moved to cruising speed and the switch is opened. Switch 16 energizes the control circuit upon the throttle being moved to the take-off position. Relay 17 arms or readies the circuit so that it will respond to a signal indicating failure of the engine. Relay 17 is actuated by switch 18 which responds to a high torque output condition of the engine. Switch 18 is normally open, but closes in response to a predetermined condition indicating high horsepower output, or torque.

Switch 18 is illustrated as a pressure-operated switch. It is inserted in the conventional hydraulic torque meter system of the propellers. Upon full powered operation of the engine, this system generates more than 80 pounds pressure. The switch is normally open and closes upon a signal indicating a high horsepower output in the engine. Switch 19 is a similar switch in the same hydraulic circuit and is normally closed but opens at some low pressure, indicating low torque of the engine, for example, 30 pounds pressure, and remains open over this pressure during satisfactory operation of the engine. Upon engine failure, the torque decreases and switch 19 closes below the predetermined pressure in the torque meter system. It is to be understood that signals indicating high torque or take-off power output of the engine and low torque or low output power of the engine may be obtained from other sources to perform the equivalent function of switches 18 and 19.

Switch 18 is required in the circuit so that if throttle 5 is advanced to a take-off position, closing switch 16 before the engine is brought up to full horsepower output, the circuit will not be operative. If throttle 5 is moved from the idling position to the forward or advanced position too fast, without switch 18, the circuit might be armed or readied by closing switch 16. Under this condition, the propeller would feather if the torque output generated less than 30 pounds pressure in the torque meter system while the engine was being brought up to power. The function of switch 18 is to prevent operation of the automatic feathering before the throttle brings the engine up to power and causes it to operate satisfactorily at full power. It is only after this time that it is desirable to have the automatic feathering operation take place. In other words, it is not desirable to have the automatic feathering circuit armed for operation while the engine is being started.

Switch 19 is actuated by a low torque condition indicating an engine failure. Switch 19 is normally closed but opens at a predetermined low torque output point, and remains open during the normal take-off or cruising operation of the engine. If the circuit conditions described above have been fulfilled, namely, the throttle in the take-off position closing switch 16, and the engine operating at full power closing switch 18, which in turn closes relay 17, any subsequent drop in torque or horsepower output of the engine indicating an engine failure will close switch 19 and actuate relays 20, 21 and 22 to perform the necessary feathering operations for continued single engine take-off of the airplane.

Relay 20 is a time delay relay and serves as an automatic feathering switch to initiate the automatic feathering action upon closing of its contact points. The time delay is necessary so that the control of the feathering will not respond to a temporary fluctuation in torque delivered by the engine due to sputtering or coughing of the engine. Relays 21 and 22 perform the functions mentioned above that go with the operations required due to the failure of an engine. Feathering relay 21 receives a signal from relay 20 indicating an engine failure. It closes circuits to hold or lock itself in to operate the feathering operation through supervisory relay 22. It further interrupts the normal manual feathering circuit of the other engine during the automatic feathering of the propeller of the failed engine so that the pilot cannot inadvertently feather the propeller on the engine delivering full horsepower. Feathering relay 21 is held closed by its electrical lock-in circuit until propeller feathering switch 9 is opened when the propeller reaches the full feathered position.

Relay 22 performs supervisory functions in the control circuit. It locks or holds itself in electrically when one propeller is feathered manually or automatically, serving as a blocking means to prevent the second propeller from feathering automatically. Relay 22 deenergizes the fuel booster pump circuit to prevent raw gasoline from being pumped into the engine. It drops out arming relay 17 and time delay relay 20, so that they will be reset when the engine is again started and brought up to full output horsepower. Relay 22 also performs the very important function in the event of two engine failure upon take-off of giving the right hand engine precedence over the left hand engine and preventing confusion in the electric control circuit. By thus maintaining one engine in the operative condition but feathering the propeller of the other, there is always a chance that the left hand engine will recover with sufficient power to complete take-off.

For a better understanding of the circuit and its function, a more detailed consideration of the electric circuit elements shown in the diagram will be required. As illustrated, the circuit elements are shown in the positions that correspond to no voltage in the main bus bar, airplane on the ground and inoperative, all manual switches open, and all automatic switches in the normal position. When power is put on the main bus 30 and switch 14 put in the "off" position so that the engine and propeller feathering operations are under the manual control of the pilot, upon closing fuel booster switch 13, power is delivered through contact 31 in relay 22 and one pole of switch 14 in parallel with the circuit of contact 31, to the fuel booster pump relay 12 to close the circuit between bus 30 and fuel booster pump 11. The fuel booster pump continues to operate while the engine is in operation until switch 13 is opened manually.

Power is delivered to manual feathering switch 4 through line 32 and contact 59' in relay 21' to contacts 34 and 35. When the engine is running under normal conditions and it is desired to feather the propeller, knob 36 of switch 4 is pushed in, and the circuit for hold-in coil 10 is completed through contact 37. Knob 36 is held in the "feather" position until propeller feathered switch 9 opens, in the full feathered position, to break the circuit of the hold-in coil 10. Through contact 38, the circuit is completed to energize feathering pump relay 7 which connects the feathering pump to bus 30. This pump delivers fluid under pressure to the feathering control mechanism. This precludes the automatic feathering of the other propeller by opening contact 62, as will be explained later, in the event the pilot turns on the automatic feathering switch at a later time and while the first propeller is still feathered. As stated above, when the feathering operation is complete, propeller feathering switch 9 opens, knob 36 returns to its neutral position, but relay 22 holds itself in by the circuit through contact 61 until the propeller is unfeathered.

To unfeather the blades of propeller 2, knob 36 of switch 4 is pulled out to the "unfeather" position. Power from contact 35 is delivered through contact 41 to close the feathering pump relay and cause the pump to deliver fluid pressure to the feathering mechanism. Contact 42 energizes solenoid valve 8 to reverse the direction of flow of fluid to the feathering mechanism to cause the blades of the propeller to unfeather. Knob 36 is held manually during the unfeathering operation until it is observed that the propeller is in the proper unfeathered position, or the tachometer indicates that a predetermined speed has been reached, and knob 36 is then released. At the same time, contact 42 short circuits coil 40 and causes relay 22 to drop out.

When the pilot selects automatic control of the feathering by moving switch 14 to the "on" position, the circuit is completed to light 15, indicating that the automatic feathering is ready for operation. Fuel booster switches 13 and 13' are closed manually after the engines are in operation. Current flows through lines 43 and 44', contact 62', line 46, contact 47 and line 48 to switch 16. Throttle 5 is moved from the retarded or idling position to the forward or take-off position. Switch 18 is normally open until approximately full power of the engine has been reached. Switch 19 is normally closed and opens at some low value of engine torque and remains open until the torque output of the engine drops indicating a failure of the engine after which time the switch closes. As throttle 5 is moved slowly from the retarded to the forward position, switch 19 opens as the throttle is moved forward and switch 16 is closed when the throttle reaches the take-off position. Switch 18 is closed when the engine is delivering take-off horsepower. When switch 16 is closed and switch 18 is closed, coil 45 of relay 17 is energized to close contactor 49. Relay 17 then holds itself electrically locked, independent of switch 18 because coil 45 is energized through closed contactor 49. Yellow signal light 50 then indicates that the control circuit is armed and ready to operate in the event of engine failure.

If the engine should fail to deliver a predetermined amount of torque or horsepower, switch 19 which is open during the proper operation of the engine, will close and energize coil 51 of time delay relay 20. After a predetermined interval contactor 52 is moved to complete the circuit between line 53 and line 54 to energize coil 55 which is held and locked in by closing contactor 56. Relay 21 closes the circuit 58 to energize relay 22 by moving contactor 57. By moving contactor 59, the circuit through line 60 is interrupted to prevent manual feathering of the left hand propeller during the automatic feathering operation of the right hand propeller. At the same time, contactor 59 completes the circuit to feathering pump relay 7. When contact 62 in relay 22 is closed, it will cause the pump to deliver hydraulic fluid to the propeller feathering mechanism. Coil 40 being energized by the closing of contactor 57 of relay 21, moves contactor 61 to close the circuit on coil 40 and electrically hold or lock-in this relay. At the same time, contactor 31 is moved to break the circuit to the fuel booster pump. Further, the actuation of relay 22 moves contactor 47 to open the circuit to switch 16, thus dropping out relay 17 and 20. Relays 21 and 22 are not affected because they are electrically held in the operative position, as described above. Contactor 62 of relay 22 opens the circuit to switch 16' on the throttle of the left hand engine so that in the event of a right hand engine failure, the automatic feathering circuit of the left hand engine will not operate.

When the propeller reaches the full feathered position, switch 9 opens, thus opening the circuit of coil 55 of relay 21 to drop out relay 21 and reestablish or close the circuit in line 60 delivering power to feathering control switch 4'. At the same time, the circuit on the feathering pump relay and pump are broken to stop further feathering. Relay 22 holds itself locked-in as long as the right hand propeller blades are feathered to prevent the left-hand engine propeller from feathering automatically. When the pilot desires to unfeather the right hand propeller, he pulls knob 36 of switch 4 to the unfeather position which through contact 42 puts the voltage of bus 30 on the ground side of coil 40, reducing the difference in potential across the coil to zero, thus causing relay 22 to drop out. Resistances 70 and 70', and 71 and 71' are necessary in their circuits to prevent short circuits to ground when the manual feathering switch is held in the unfeather position to drop out relays 21 and 22. This permits the left hand propeller feathering control circuits to operate, if the occasion arises.

In the event of both engines failing, it is obvious that no useful purpose would be accomplished by feathering both propellers. Experience dictates that it is best to feather one propeller to reduce drag and hope that the other engine will pick up and continue the take-off of the airplane. Should switches 19 and 19' signal engine failures, time delay relays 20 and 20' will deliver signals to 21 and 21' which will energize coils 40 and 40' of relays 22 and 22'. Contact 61 will be moved by coil 40 to electrically hold or lock relay 22. The circuit to electrically lock-in coil 40' is through contact 61' and line 63, which is interrupted by the movement of contact 61. Contact 62 breaks the circuit 63' and 48' causing relays 17', 20' and 21' to drop out. Thus, it will be seen that in the event of two engine failure, relay 22 gives the feathering operation of the right hand engine precedence over the feathering operation of the left hand engine and permits feathering of the right hand engine while it precludes automatic feathering of the left hand engine.

If the right hand engine should fail and cause the automatic feathering control circuit to operate the feathering mechanism, and about half way through the feathering cycle the engine should restart, the pilot has the choice of letting the feathering of the right hand engine go to completion and depend upon the left hand engine alone for take-off, or he might choose to stop the automatic feathering since the engine has picked up and is again capable of delivering power. In that event, with the automatic control circuit in operation, it is merely necessary to pull knob 36 of switch 4 to the unfeather position, which puts line voltage on contact 42 and the ground side of coil 40 to drop out relay 22. This will stop the feathering of the right hand propeller and move the solenoid valve 8 to reverse the flow of fluid and cause the propeller blades to unfeather and reestablish the right hand engine as an operating unit. In a similar manner, line voltage on contact 29 will cause relay 21 to drop out. Relays 17 and 20 would have already been dropped out by supervisory relay 22.

The foregoing specification is intended to describe the application of the invention to a hydraulically actuated, electrically controlled propeller feathering mechanism. It is obvious that any type of torque responsive devices can be employed that will actuate switches 18 and 19 in response to high torque output, or a low torque condition of the engine. It should be further understood that the feathering pump relay can be connected to energize any electrical or mechanical, as well as hydraulic feathering control mechanism.

It is to be understood that certain changes, alterations, modifications and substitutions may be made without departing from the spirit and scope of the appended claims.

We claim as our invention:

1. A propeller feathering control circuit for a two engine airplane, each engine having a throttle, fuel booster pump, a feathering propeller, propeller feathering mechanism and controls therefor, said controls including an electric control circuit interconnecting said feathering mechanism controls, an arming switch to energize said control circuit associated with each throttle so that said switch will be closed only when said throttle is in the forward or take-off position, an arming relay means energized by said arming switch, a high torque switch means actuated by full power torque of the engine to close said arming relay in the armed position, a second torque switch means arranged to close said control circuit in response to a predetermined low value of torque in the engine, a time delay relay in said circuit to preclude closing said control circuit in response to a signal resulting from momentary fluctuations in torque, a feathering relay arranged in the circuit to receive the signal from the time delay relay only when the propellers are in some position other than full feathered, said relay, upon being actuated, energizing the feathering mechanism of one propeller and interrupting the normal feathering control of the other propeller until the feathering operation is completed and a supervisory relay responsive to actuation of said feathering relay to deenergize the fuel booster pump to the low torque engine and give precedence to one engine over the other engine in the event of simultaneous engine failure, and deenergize said arming relays and said time delay relays until the full feathering position of the propellers has been reached and the propeller unfeathered.

2. An automatic propeller feathering device for a multi-engine airplane, each engine having a throttle, a feathering propeller, a propeller feathering mechanism and a control means for each said propeller feathering mechanism, an electric control circuit interconnecting said propeller mechanism controls, an arming switch to energize said circuit associated with each throttle so that said switch will be closed only when said throttle is advanced to the take-off position, an arming relay of the self-locking type energized by said arming switch, a switch actuated in response to high torque generated for take-off operation of the engine, to move said arming relay to the closed position, a torque actuated switch arranged to close said control circuit in response to a predetermined low value of torque in the engine when said arming relay is held in the closed position, a time delay relay associated with said torque switch to preclude closing said control circuit in response to momentary fluctuations in torque, said control circuit arranged to actuate said feathering mechanism of said propellers in response to a low torque condition, a full feathered cut-out switch to deenergize said feathering mechanism control when the propeller has reached the full feathered position, and a relay in that portion of said control circuits interconnecting a plurality of propeller controls that is actuated in response to a low torque condition in one engine to interrupt the automatic feathering control circuit of the other engines and to preclude manual feathering of the other propellers only during the time of the automatic feathering.

3. A torque actuated propeller feathering control system for a twin engine airplane installation including propellers with feathering mechanisms, having manual throttles for said engines and manual controls for the propeller feathering mechanisms including means to parallel said torque actuated control system with said manual feathering control systems, throttle actuated means in said torque actuated control system to render said control system operative only when said throttle is in the take-off power position, torque responsive means on each engine to arm said control system upon the engines delivering take-off power, low torque responsive means in said control system in each engine to actuate the propeller feathering mechanism of one engine upon a predetermined low torque output of that engine, and means in said torque actuated propeller feathering control system connected to the feathering mechanism of both propellers to prevent the automatic operation of one propeller feathering mechanism when the other propeller is feathered.

4. An automatic feathering control system for a multi-engine airplane installation, each engine having a throttle, a feathering propeller, and a manually controlled propeller feathering mechanism therefor, an electric control circuit for said propeller feathering mechanism, a switch to energize said control circuit associated with each throttle so that the circuit can be closed only when the throttle is advanced to the take-off position, an arming switch in said control circuit that will permit the operation of said control circuit only after take-off power of the engine has been reached, a switch on each engine arranged to close said control circuit actuated by a predetermined low value of torque in the engine indicative of an engine failure, said control circuit so arranged that in response to a signal from said last mentioned switch, the electric control of the propeller feathering mechanism will be energized to feather the propeller, a time delay switch in said control circuit to discriminate between signals of momentary fluctuations in torque output and to permit the circuit to feather the propeller only upon an engine failure, and interconnecting control means in said automatic system connected to the propeller feathering mechanisms to prevent the automatic feathering of one propeller if any other propeller is feathered.

5. An automatic feathering control system for a twin engine airplane installation having manual throttle controls for said engines, a feathering propeller, and manual controls for the propeller feathering mechanisms, including switch means to parallel the automatic control system with said manual feathering controls at will, means associated with said throttles to render said automatic system operative only when each throttle is advanced to the take-off power position, torque responsive means on each said engine to arm said automatic control system upon the engine delivering take-off torque, means responsive to a predetermined low torque output of each engine indicative of an engine failure in said automatic control system to actuate said propeller feathering mechanism to feather the propeller of that engine, and means in said automatic control system connected to the feathering mechanisms of both propellers to prevent the automatic operation of one propeller feathering mechanism when the other propeller is feathered.

6. An automatic feathering control system for a multi-engine airplane installation, each engine having a throttle, a feathering propeller and a manually controlled propeller feathering mechanism for said propeller, an electric control circuit for each said propeller feathering mechanism, a switch to energize said control circuit associated with said throttle so that the circuit can be closed only when the throttle is advanced to the take-off power position, an arming switch in said control circuit actuated in response to a predetermined high value of torque from the engine to permit the operation of said control circuit only after take-off power of the engine has been reached, a switch on each engine arranged to close said control circuit actuated by a predetermined low value of torque in the engine, indicative of an engine failure, said control circuit being so arranged that in response to a signal from said last mentioned switch, the electric control of the propeller feathering mechanism will be energized to feather the propeller.

7. A torque actuated propeller feathering control system for a twin engine airplane installation each having a feathering propeller and feathering mechanism, having manual throttles for said engines and manual controls for the propeller feathering mechanisms including means to parallel said torque actuated control system with said manual feathering control systems, throttle actuated means in said torque actuated control system to render said control system operative only when said throttle is in the take-off power position, torque responsive means on each engine to arm said control system upon the engines delivering take-off power, and low torque responsive means in said control system in each engine to actuate the propeller feathering mechanism of one engine upon a predetermined low torque output of that engine.

8. A torque actuated propeller feathering control system for a twin engine airplane installation each having a feathering propeller and feathering mechanism, having manual throttles for said engines and manual controls for each propeller feathering mechanism including a manually operated mechanism to parallel said torque actuated control system with said manual feathering control system at will, a throttle actuated mechanism on each engine in said torque actuated control system to render said control system operative only when each of said throttles is in the take-off power position, a torque responsive device on each said engine to preset said control system upon the engine delivering take-off power, and a low torque device on each engine in said control system to actuate said propeller feathering mechanism of that engine upon a predetermined low torque output of the engine.

9. A torque actuated propeller feathering control system for a twin engine airplane installation each including a feathering propeller and feathering mechanism, having manual throttles for said engines and manual controls for each propeller feathering mechanism including a manually operated mechanism to parallel said torque actuated control system with said manual feathering controls at will, a throttle actuated mechanism on each engine in said torque actuated control system to render said control system operative only when said throttle is in the take-off power position, a torque responsive device on each said engine to preset said control system upon the engine delivering take-off power, a low torque device on each engine in said control system to actuate the propeller feathering mechanism upon a predetermined low torque output of the engine, a time delay mechanism in said low torque actuated control circuit to discriminate between signals of momentary fluctuations in torque output and a signal of engine failure to cause the control system to feather the propeller only upon engine failure, and an interconnecting mechanism in said torque actuated control system connected to the feathering mechanism of both propellers to prevent the automatic operation of one propeller feathering mechanism when the other propeller is feathered.

10. An automatic propeller feathering device for a multi-engine airplane, each engine having a throttle, a feathering propeller, a propeller feathering mechanism and a control means for each said propeller feathering mechanism, an electric control circuit interconnecting said propeller mechanism controls, an arming switch to energize said circuit associated with each throttle so that said switch will be closed only when said throttle is advanced to the take-off position, an arming relay of the self-locking type energized by said arming switch, a switch actuated in response to high torque required for take-off full powered operation of the engine to move said arming relay to the closed position, a torque actuated switch arranged to close a control circuit in response to a predetermined low value of torque in the engine when said arming relay is held in the closed position, said control circuit arranged to actuate said feathering mechanism of said propellers in response to a low torque condition, a full feathered cut-out switch to deenergize said feathering mechanism control when the propeller has reached the full feathered position, and a relay in that portion of said control circuits interconnecting a plurality of propeller controls that is actuated in response to a low torque condition in one engine to interrupt the automatic feathering control circuit of the other engines and to preclude manual feathering of the other propellers only during the time of the automatic feathering.

11. An automatic feathering control system for a twin engine airplane installation each including a feathering propeller with a feathering mechanism, having manual throttle controls for said engines and manual controls for the propeller feathering mechanisms including switch means to parallel the automatic control system with said manual feathering controls at will, means associated with said throttles to render said automatic system operative only when each throttle is advanced to the take-off power position, torque responsive means on each said engine to arm said automatic control system upon the engine delivering take-off torque, and means responsive to a predetermined low torque output of each engine, indicative of an engine failure, in said automatic control system to actuate said propeller feathering mechanism to feather the propeller of that engine.

12. A torque actuated propeller feathering control system for a twin engine airplane installation each including a feathering propeller with a feathering mechanism, having manual throttles for said engines and manual controls for each propeller feathering mechanism including a manually operated mechanism to parallel said torque actuated control system with said manual feathering controls at will, a throttle actuated mechanism on each engine in said torque actuated control system to render said control system operative only when said throttle is in the take-off power position, a torque responsive device on each said engine to preset said control system upon the engine delivering take-off power, a low torque device on each engine in said control system to actuate the propeller feathering mechanism of that engine upon a predetermined low torque output of the engine, and a time delay mechanism in said torque actuated control circuit to discriminate between signals of momentary fluctuations in torque output and a signal of engine failure to cause the control system to feather the propeller only upon engine failure.

13. An automatic feathering control system for a twin engine airplane installation each including a feathering propeller with a feathering mechanism, having manual throttle controls for said engines and manual controls for the propeller feathering mechanisms including switch means to parallel the automatic control system with said manual feathering controls at will, means associated with said throttles to render said automatic system operative only when each throttle is advanced to the take-off power position, torque responsive means on said engine to arm said automatic control system upon the engine delivering take-off torque, means responsive to a predetermined low torque output of each engine, indicative of an engine failure, in said automatic control system to actuate said propeller feathering mechanism to feather the propeller of that engine, means in said automatic control system connected to the feathering mechanisms of both propellers to prevent the automatic operation of one propeller feathering mechanism when the other propeller is feathered, and time delay means in said automatic control system to discriminate between signals of momentary fluctuations of torque output and a signal of an engine failure to cause said automatic control system to feather the propeller only upon engine failure.

14. An automatic feathering control system for a multi-engine airplane installation each including a feathering propeller, each engine having a throttle and a manually controlled propeller feathering mechanism for said propeller, an electric control circuit for said propeller feathering mechanism, a switch to energize said control circuit associated with said throttle so that the circuit can be closed only when the throttle is advanced to the take-off power position, an arming switch in said control circuit that will permit the operation of said automatic control circuit only after take-off power of the engine has been reached, a switch on each engine arranged to close said control circuit actuated by a predetermined low value of torque in the engine indicative of an engine failure, said control circuit being so arranged that in response to a signal from said last mentioned switch, the electric control of the propeller feathering mechanism will be energized to feather the propeller, and a time delay switch in said automatic control circuit to discriminate between signals of momentary fluctuations in torque output, and to permit the circuit to feather the propeller only upon an engine failure.

15. A torque actuated propeller feathering control system for a twin engine airplane installation, each including a feathering propeller with a feathering mechanism, having manual throttles for said engines and manual controls for the propeller feathering mechanisms including means to parallel said torque actuated control system with said manual feathering controls, throttle actuated means in said torque actuated control system to render said control system operative only when said throttle is in the take-off power position, torque responsive means on each engine to arm said control system upon the engines delivering take-off power, low torque responsive means in said control system in each engine to actuate said propeller feathering mechanism of one engine upon a predetermined low torque output of that engine, time delay means in said torque actuated control system to discriminate between signals of momentary fluctuations in engine torque output and a signal of engine failure to permit the control system to feather the propellers only upon engine failure, and means in said torque actuated propeller feathering control system connected to the feathering mechanism of both propellers to prevent the automatic operation of one propeller feathering mechanism when the other propeller is feathered.

16. An automatic propeller feathering device for a multi-engine airplane, each having a feathering propeller, and each having a throttle and propeller feathering mechanism and a control circuit for each said propeller feathering mechanism, an electric control circuit interconnecting said propeller mechanism control circuits, an arming switch to energize said circuit associated with each throttle so that said switch will be closed only when said throttle is in forward take-off position, an arming relay of the self-locking type energized by said arming switch, a switch actuated in response to high torque generated by full powered operation of the engine to move said arming relay to the closed position, a torque actuated switch arranged to close a control circuit in response to a predetermined low value of torque in the engine when said arming relay is held in the closed position, said control circuit arranged to actuate said feathering mechanism of said propellers in response to a low torque condition, and a relay in that portion of said control circuits interconnecting a plurality of propeller controls that is actuated in response to a low torque condition in one engine to interrupt the automatic feathering control circuit of the other engine and to preclude manual feathering of the other propeller only during the time of the automatic feathering.

17. A safety feathering system for plural engine aircraft having feathering propellers, feathering means for independently feathering different individual propellers, engine control means for imposing power demand on the engines and normal feathering controls connected to effect selective operation of the propeller feathering means of different engines, and comprising safety feathering controls actuated by said engine control means in the power demand operation of the latter and operating connections from said safety feathering controls to said propeller feathering means including torque switches operated by the individual engines and connected to complete said operating connections between said safety feathering controls and said propeller feathering means in the absence of engine torque, relay mechanism in circuit with said torque switches and connected to hold propeller feathering operation initiated to a complete feathering cycle and to prevent initiation of more than one feathering cycle at a time, and electric timing means interposed in said operating connections for delaying initiation of a feathering cycle for a definite time interval providing opportunity for a failing engine to resume power.

18. A safety feathering system for plural engine aircraft having feathering propellers, feathering means for independently feathering different individual propellers, engine control means for imposing power demand on the engines and normal feathering controls connected to effect selective operation of the propeller feathering means of different engines, and comprising safety feathering controls actuated by said engine control means in the power demand operation of the latter and operating connections from said safety feathering controls to said propeller feathering means including torque switches operated by the individual engines and connected to complete said operating connections between said safety feathering controls and said propeller feathering means in the absence of engine torque and relay mechanism in circuit with said torque switches and connected to hold propeller feathering operation initiated to a complete feathering cycle and to prevent initiation of more than one feathering cycle at a time.

19. A safety feathering system for plural engine aircraft, each engine having a feathering propeller, feathering means for independently feathering each individual propeller and engine control means for imposing power demand on the engines, and comprising safety feathering control means actuated by said engine control means in the power demand operation of the latter, circuit connections from said safety feathering control means to said propeller feathering means include torque sensing means associated with each engine and actuated by each engine in the absence of engine torque to complete a circuit through said circuit connections between said safety feathering control means and the propeller feathering means of the engine having an absence of engine torque, and means included in said circuit connections for preventing automatic feathering operation of the propeller of more than one engine at a time.

20. An engine failure responsive system for use in conjunction with a plurality of variable pitch feathering blade propellers, each of which is driven by an aircraft engine, comprising in combination, propeller feathering means for each propeller, torque responsive means associated with each of said engines, each torque responsive means being actuated by a failure of its associated engine, feathering switch means for each propeller, control means for each feathering switch wired in circuit with its respective torque responsive means, each of said feathering switches having embodied therein contact means in circuit with the control means for the other feathering switches which, when open, will prevent completion of a circuit from a torque responsive means to its respective feathering switch control means, a throttle switch associated with each engine, each throttle switch included in circuit with the torque responsive means for the respective engine, said throttle switches when open, preventing completion of a circuit through a torque responsive means, said propeller feathering means for each propeller having an electrical connection with a respective feathering switch for energization thereof upon actuation of said feathering switch, said feathering switches being actuated when a circuit is completed through a throttle switch and a corresponding torque responsive means.

21. An engine failure responsive system adapted to be utilized in conjunction with a plurality of variable pitch propellers, each operatively associated with an aircraft engine comprising, in combination, torque responsive means operatively associated with each of said engines and each adapted to be actuated upon failure of its associated engine, feathering switch means wired in circuit with each of said torque responsive means, blocking relay means in circuit with said feathering switch means, said blocking means being adapted when open to prevent the flow of current to the feathering switches and a propeller feathering circuit associated with each propeller and having an electrical connection with a feathering switch for energization thereof on actuation of said feathering switch.

22. An engine failure responsive system adapted to be utilized in conjunction with a plurality of variable pitch propellers, each operatively associated with an aircraft engine, comprising, in combination, torque responsive means operatively connected with each of said engines and each adapted to be actuated upon failure of its associated engine, feathering switch means wired in circuit with each of said torque responsive means, throttle switches adapted to prevent the flow of current to said torque responsive means, blocking relay means in circuit with said feathering switch means, said blocking relay means adapted when open to prevent the flow of current to the feathering switches and a propeller feathering circuit associated with each of said variable pitch propellers and having an electrical connection with a feathering switch for energization thereof on actuation of said feathering switch.

23. In combination with a plurality of variable pitch propellers each operatively connected to an aircraft engine, an engine failure responsive automatic propeller feathering system comprising a torque responsive means for each of said engines connected for operation upon failure of its associated engine, a plurality of throttle switches, one provided for each of said torque responsive means, and each adapted to be actuated to prevent operation of its associated torque responsive means, a feathering switch electrically connected to each torque responsive means for actuation thereby, a blocking electric relay means in circuit with each feathering switch adapted to be actuated to prevent operation of the feathering switch, means provided for each feathering switch adapted when its feathering switch is actuated to prevent operation of any other feathering switch, and a propeller feathering means associated with each propeller and having an operative connection with a feathering switch for energization thereof upon actuation of said feathering switch.

24. In combination with a plurality of variable pitch propellers each operatively connected to an aircraft engine, an engine failure responsive automatic propeller feathering system comprising a torque responsive means for each of said engines connected for operation upon failure of its associated engine, a feathering switch electrically connected to each torque responsive means for actuation thereby, means provided for each feathering switch operative when its feathering switch is actuated to prevent operation of any other feathering switch, and a propeller feathering means for actuating each propeller and having an operative connection with a feathering switch for energization thereof upon actuation of said feathering switch by said torque responsive means.

25. In combination with a plurality of variable pitch propellers each operatively connected to an aircraft engine, an engine failure responsive automatic propeller feathering system comprising a torque responsive means for each of said engines connected for operation upon failure of its associated engine, said torque responsive means comprising a pressure operated electric switch, a feathering switch electrically connected to each pressure operated electric switch for operation thereby, means provided for each feathering switch operative when its feathering switch is actuated to prevent operation of any other feathering switch, and a propeller feathering means for actuating each propeller and having an operative connection with a feathering switch for energization thereof upon operation of said feathering switch by the pressure operated electric switch.

26. An engine failure responsive system to be utilized in conjunction with an aircraft engine-driven variable pitch propeller comprising, in combination, torque responsive means actuable on the occurrence of an engine failure, feathering switch means wired in circuit with said torque responsive means to be activated thereby, indicating means in circuit with said feathering switch means for signalling the initiation of the automatic feathering cycle and a propeller feathering circuit electrically connected to the feathering switch means to be energized by said feathering switch means on activation of the latter by said torque responsive means.

27. A propeller feathering system operable on engine failure to automatically feather a variable pitch propeller having an operative connection with an aircraft engine comprising, in combination, torque responsive means operatively connected to the engine to be actuated on the occurrence of an engine failure, feathering switch means wired in circuit with said torque responsive means to be activated thereby, indicating means in circuit with said feathering switch means for signalling the initiation of the automatic feathering process and a propeller feathering circuit electrically connected to the feathering switch means to be energized by said feathering switch means on operation of the latter by said torque responsive means.

28. An engine failure responsive automatic feathering system for a variable pitch propeller having an operative connection with an aircraft engine comprising, in combination, torque responsive means actuable on the occurrence of an engine failure operatively connected to the engine, time lag means incorporated in said torque responsive means to prevent the activation of said torque responsive means by a momentary power failure, feathering switch means wired in circuit with said torque responsive means to be activated thereby, indicating means in circuit with said feathering switch means for signalling the initiation of the automatic feathering cycle and a propeller feathering circuit electrically connected to the feathering switch means energized by said feathering switch means on operation of the latter by said torque responsive means.

29. An engine failure responsive system adapted to be utilized in conjunction with a plurality of variable pitch propellers, each of which is operatively connected to an aircraft engine, comprising, in combination, torque responsive means provided for each of said engines and each adapted to be actuated upon failure of its associated engine, feathering switch means wired in circuit with each of said torque responsive means, each of said feathering switch means having embodied therein contact means through which the power for activating a companion feathering switch means must first flow and a propeller feathering circuit provided for each propeller and having an electrical connection with a feathering switch means for energization thereof on actuation of said feathering switch means.

30. An engine failure responsive system adapted to be utilized in conjunction with a plurality of variable pitch propellers, each of which is operatively connected to an aircraft engine, comprising, in combination, torque responsive means provided for each of said engines and each adapted to be actuated upon failure of its associated engine, feathering switch means wired in circuit with each of said torque responsive means, each of said feathering switch means having embodied therein contact means which, when open, prevent the flow of current from one of said torque responsive means into a companion feathering switch means, a plurality of throttle switches, each of which is operatively connected with a particular torque responsive means and acts when open to prevent the flow of current thereinto and a propeller feathering circuit for each propeller and having an electrical connection with a feathering switch means for energization thereof on actuation of said feathering switch means.

31. A safety propeller feathering system for plural engine aircraft comprising in combination with the normal feathering system for each engine, an engine torque detector for each engine, means controlled by said engine torque detectors for initiating propeller feathering operation of the propeller feathering system of an engine losing torque identified by said engine torque detectors and a master control common to all of said feathering systems for rendering said last mentioned means inoperative at any time and for leaving the individual engine feathering systems in operative condition.

32. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque and means included in said operating connections for preventing automatic feathering operation of the propeller of more than one engine at a time.

33. A safety feathering system for plural engine aircraft having feathering propellers and propeller feathering means for independently feathering different propellers, and comprising safety feathering control means and connections therefrom for actuating the feathering means for any of the different propellers and including engine torque sensing means operable by individual engines and connected to complete said operating connections from said safety feathering control means to the propeller feathering means of an engine failing to deliver torque and means in said connections for preventing operation of the propeller feathering means of more than one engine at a time.

RICHARD A. ENGELHARDT.
WILFRED L. KERSHAW.
ROBERT W. SCHROEDER.

REFERENCES CITED

The following references are of record in the file of this patent:

UNITED STATES PATENTS

| Number | Name | Date |
|---|---|---|
| 2,257,126 | Rindfleish | Sept. 30, 1941 |
| 2,320,195 | Rindfleish | May 25, 1943 |
| 2,339,090 | McIntosh | Jan. 11, 1944 |
| 2,374,276 | French | Apr. 24, 1945 |
| 2,471,953 | Hamilton | May 31, 1949 |